United States Patent Office 3,814,777
Patented June 4, 1974

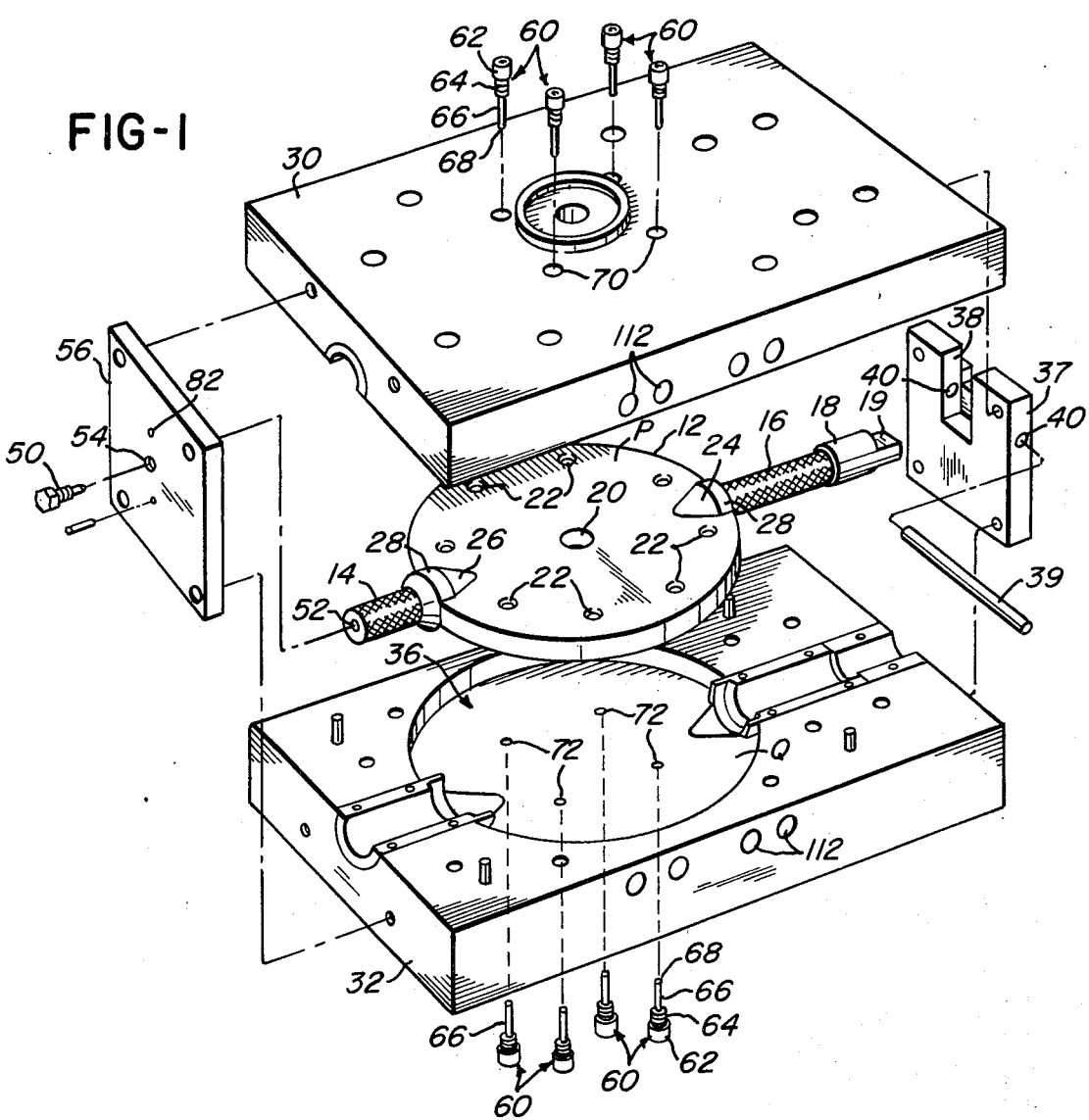
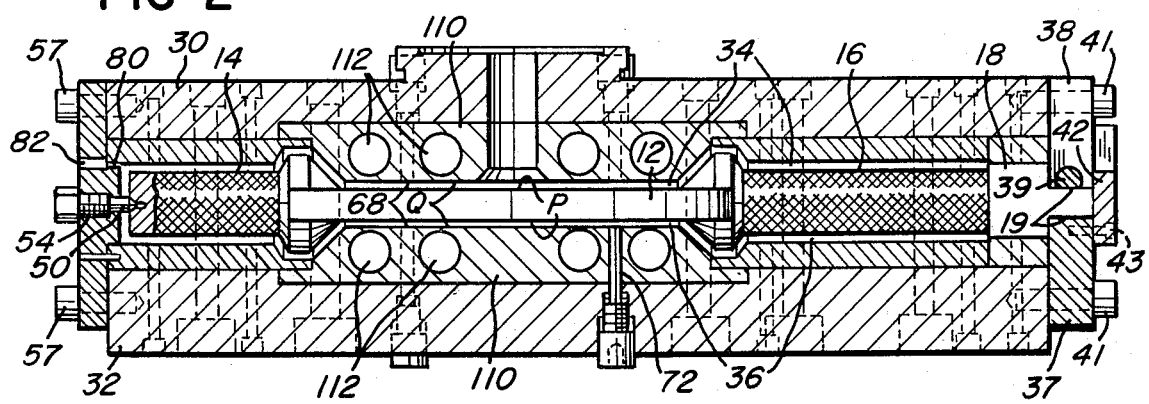

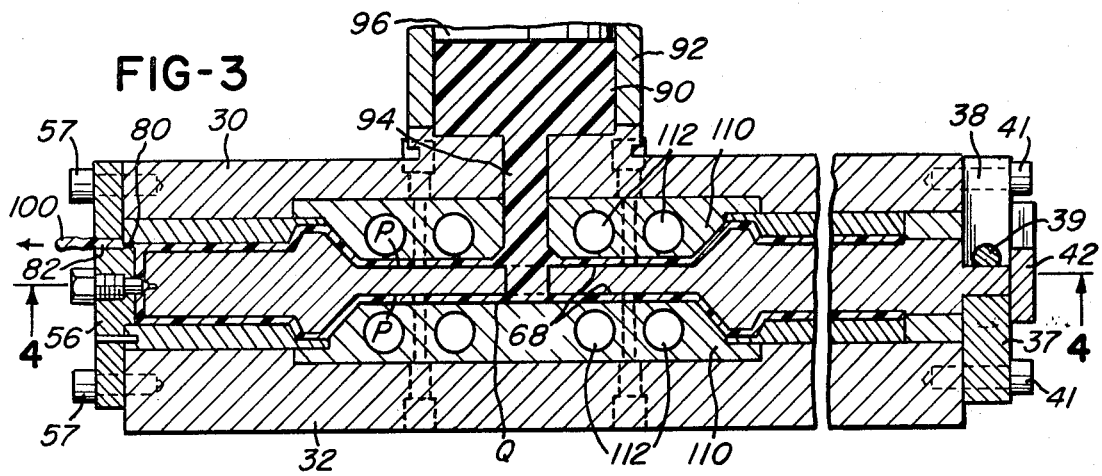
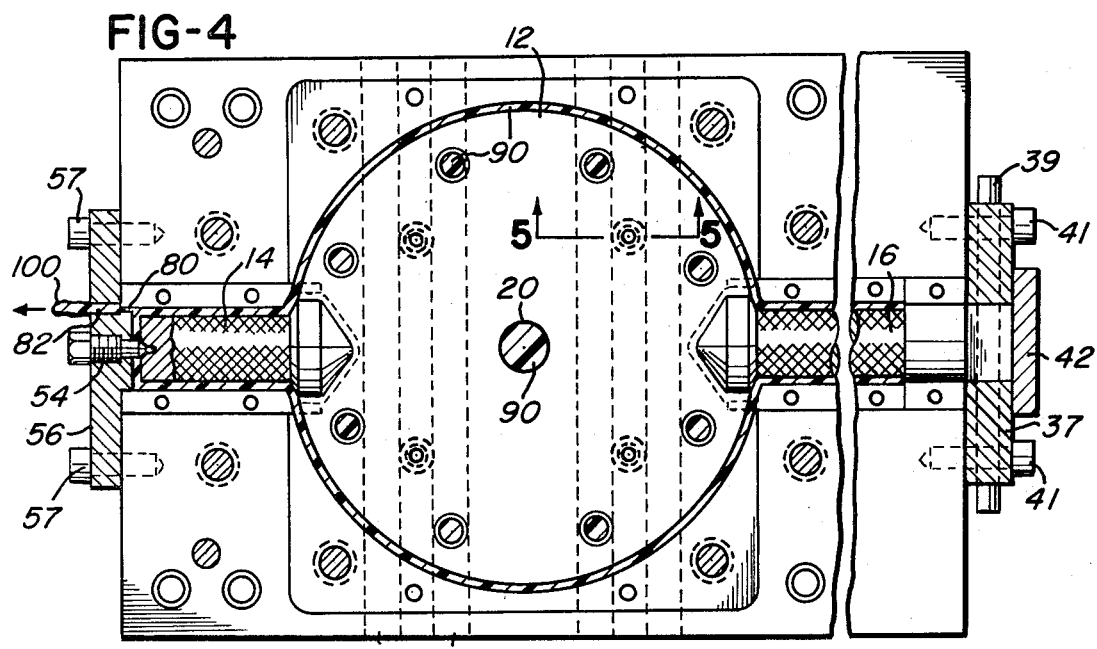
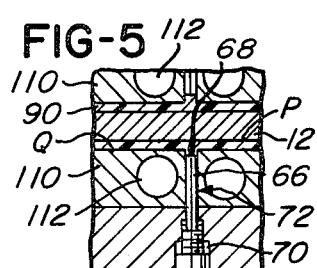
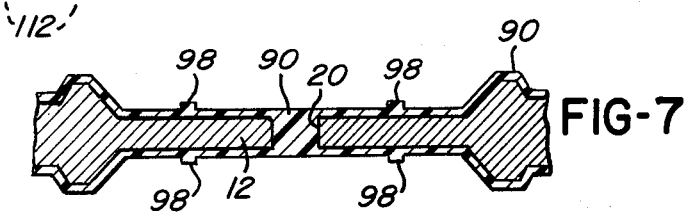
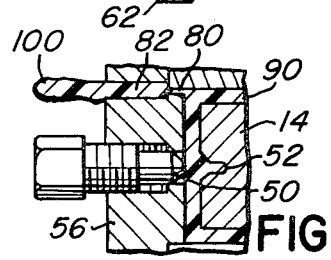
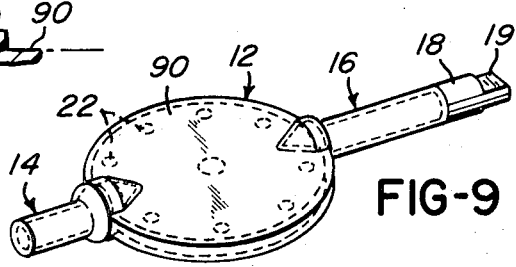

3,814,777
METHOD OF MAKING A COATED BUTTERFLY VALVING MEMBER
Peter James Schmidt, Cincinnati, Ohio, assignor to Xomox Corporation, Cincinnati, Ohio
Filed June 15, 1972, Ser. No. 262,978
Int. Cl. B29b 3/00; B29f 1/10
U.S. Cl. 264—40                                    1 Claim

ABSTRACT OF THE DISCLOSURE

All surfaces of a butterfly type valving member which may be exposed to attack by corrosive substances, are coated with a protective material of the class of tetrafluoroethylene or equivalent substance, by a high-pressure and high-temperature molding process; the process involves initially providing lateral support for the opposite faces of the valve disc for maintaining a predetermined spacing between the axial faces of the disc and mold during the introduction of heat fluidified coating material into the mold, and of then withdrawing such lateral support first from one side and then from the other side of the disc during a critical phase of the molding procedure to ensure uniform coating of said disc.

---

This invention relates to an improvement in the method of manufacturing a coated valving member, namely a butterfly or paddle valve, such as disclosed in U.S. Pat. 3,670,071.

In practicing the method of the aforesaid prior art patent the valve disc portion of the valving member would on occasion be distorted, flexed or otherwise displaced from its initial position wthin the mold incident to the introduction of coating material, under pressure, into the interior of the mold, with the result that the thickness of coating material on the opposite faces of the valve disc was non-uniform, even though the valving member was securely anchored in place, within the mold by its shaft sections.

The present invention is directed to a method of providing the valve disc of a valving member with coatings of uniform, predetermined thickness.

The subject valving member relates to a butterfly valve or paddle valve, which comprises a substantially flat circular valve disc of metal or other rigid material having opposed axial faces, and having at opposite ends of a diameter or chord a pair of integral, axially aligned cylindrical shaft sections disposed in substantially the mean plane of the body plate.

In accordance with the present invention, opposite faces of the valve disc of the valving member are uniformly coated with a tough, corrosion-resistant, wear-resistant material having a low coefficient of friction and inherent self-lubricating properties. The coating material may be a moldable plastic of the class of Teflon TFE (tetrafluoroethylene), or other high density polyethylene, polycarbonate or polypropylene, and including such products as Teflon FEP, a trademark of E. I. du Pont de Nemours and Company, Kynar, a polymer of vinylidene fluoride, $CH_2=CF_2$, a trademark of Pennsalt Chemicals Company, Kel-F, trifluorochloroethylene polymer $(C_2ClF_3)$, a trademark of Minnesota Mining and Manufacturing Company, Penton, a polymer of 3,3-bis (chloromethyl) oxetane, a trademark of Hercules Powder Company, and the like. Of the above trade names, all except Kynar appear in *The Condensed Chemical Dictionary*, Sixth Edition, Reinhold Publishing Corporation, New York, 1961, and Kynar appears in the *Handbook of Material Trade Names*, Supplement IV, Zimmerman and Lavine, Industrial Research Service Inc., Dover, N.H., 1965. Accordingly, all of these trade names have well-known meanings to persons skilled in the art.

The coating process involves high-pressure, high-temperature application of the coating material uniformly to opposite faces of the valve disc and to both shaft sections. The coating is applied by injection molding procedure, and involves laterally supporting the valve disc portion of a valving member in a mold in such manner as will preclude any distortion, flexing or the like of the disc incident to the application of coating material uniformly onto all surfaces of the valve disc and its shaft sections, including the terminal end of one of said sections. For this purpose, a novel procedure and technique is resorted to, as an object of the present invention.

A primary object of the present invention is to provide a highly effective method of producing a uniformly coated valving member.

Another object of the invention is to minimize the cost of producing a uniformly, plastic coated valving member by eliminating most or all machining of the valving member components.

Another object is to provide an improved coating process for valving members which is highly efficient, and productive of a minimum number of rejects in the manufacture, the coating being fully protective of all areas of the valving member which are or might be exposed to corrosive substances in service.

A further object of the invention is to provide a novel method and means of coating, whereby the shaft terminal end of the valving member may be effectively and completely coated during the coating operation, with the assurance of maintaining uniformity of coating thickness on the opposite faces of the valve disc areas of the valving member.

The foregoing and other objects are attained by the means described herein and illustrated upon the accompanying drawings, in which:

FIG. 1 is an exploded, perspective view of a two element mold and a butterfly type valving member illustrating an initial step of the method of the present invention.

FIG. 2 is a cross-section of the assembled mold of FIG. 1 with the valving member of FIG. 1 axially supported therein during heating of the mold and valving member prior to injection of heat fluidified plastic into the mold and about the valving member.

FIG. 3 is a view similar to FIG. 2 showing the lateral support for the valve disc as of the time when the mold is charged with plastic coating material.

FIG. 4 is a cross-sectional view taken on line 4—4 of FIG. 3.

FIG. 5 is a partial, sectional view taken on line 5—5 of FIG. 4, showing a phase of the molding process wherein an adjustable stop member supportive of the valving disc within the mold has been retracted, to permit flow of coating material into the void resulting from withdrawal of the stop member from contact with the face of the valving disc.

FIG. 6 is a partial, sectional view showing a phase of the molding process wherein the mandrel supportive of the valving member within the mold has been retracted, to permit flow of coating material into the end cavity of the valving member shaft.

FIG. 7 is a sectional view of the coated valve disc portion of a valving member as removed from the mold.

FIG. 8 is an enlarged sectional view of a portion of the coating material of FIG. 7.

FIG. 9 is a perspective view of a finished valving member.

The valving member as herein disclosed comprises a substantially flat circular body plate or valve disc 12 of metal or other rigid material, having axially aligned cylindrical shaft sections 14 and 16. The shaft section 14 may be considered a stud shaft or journal adapted to rotate in a bearing located within a valve body. Shaft section 16 likewise is to be supported in a bearing of the valve body, and may be considered the actuating stem of the valving member.

Shaft sections 14 and 16 may be welded, brazed or otherwise fixedly secured to valve disc 12, or if desired, they may be formed integrally therewith as by casting, molding, forging or other process. The assembly may be constructed of a corrosion-resistant material, preferably of metal such as stainless steel, brass, bronze or the like. The axes of shaft sections 14 and 16 are disposed in alignment, and are located in the mean plane of plate 12. The journal stud 14 and a portion of stem 16 are knurled or otherwise roughened as shown, for effecting and enhancing a bond with the coating material to be applied thereto.

The outer end of stem or shank 16 may carry a suitable head or the like 18 flattened as at 19 to receive a wrench, handle or other actuating means whereby the valving member may be rotated axially of members 14 and 16 either manually or by a powered actuator (not illustrated). Valve disc 12 may be provided with a center hole or through aperture 20, and with a circular row of through openings 22 spaced from the rim or perimeter of the disc. In the finished product, the openings 20 and 22 are completely filled with the plastic material which coats the valving member.

Conical hubs 24 and 26 form connections between the shaft sections and disc 12, and each hub includes a conical annular bearing surface 28 arranged concentrically with the shaft section axes. The bearing surfaces 28 are adapted to seal against suitable bearing surfaces of a valve body (not shown) to oppose leakage of fluid around and/or along shafts 14 and 16; however, details of this are believed unnecessary for a full understanding of the present invention. All sharp edges are to be removed from the perimeter of valve disc 12, and such edges are rounded off, by preference.

In accordance with the present invention, the valving member is to be coated with a tough, corrosion-resistant material having a low coefficient of friction and characterized by its durability and inherent self-lubrication qualities. The coating material may be a moldable plastic of the class of Teflon TFE (tetrafluoroethylene), or other high density polyethylene, polycarbonate, or polypropylene, and including such products as Teflon FEP, a trademark of E. I. du Pont de Nemours and Company, Kynar, a polymer of vinylidene fluoride, $CH_2=CF_2$, a trademark of Pennsalt Chemicals Company, Kel-F, trifluorochloroethylene polymer ($C_2ClF_3$), a trademark of Minnesota Mining and Manufacturing Company, Penton, a polymer of 3,3-bis (chloromethyl) oxetane, a trademark of Hercules Powder Company, and the like.

To apply the coating to the valving member, a bi-part metallic mold is provided (FIGS. 1 through 3), having a first or upper part 30 and a second or lower part 32 provided with substantially identical cavities 34 and 36, the cavities each being shaped to the outline of the valving member, with clearance all around to accommodate the plastic material injected for enveloping the valving member. The outline of each mold cavity corresponds substantially to the shape which results from a plane bisecting the thickness or valve disc 12 and shaft sections 14, 16, plus the necessary clearance mentioned.

The mold includes suitable clamping means for the end of shaft 16 in the form of a plate 37 having a slot 38 therein for the reception of flat 19 of the shaft head 18 to center the shaft section 16 within the mold cavity while the mold is closed on the valving member (FIGS. 2-4). A flat sided pin 39 is received in openings 40 of plate 37 for engaging the other flat 19 of shaft head 18 for positively positioning axial shaft 16 relative to the mold, it being noted that plate 37 is secured to the mold parts 30 and 32 by means of bolts 41. An end plate 42 is secured to the outer surface of plate 37 by means of bolts 43, FIG. 2.

A mandrel, which may be in the form of a pointed screw 50, is adapted to be advanced into the turning center hole 52 of the stud shaft section 14, to accurately center said shaft section within the mold cavity according to FIGS. 2 and 3. The mandrel 50 may have a screw-threaded connection at 54 with a normally fixed bridge plate 56 that spans the mold parts to which it is secured by means of bolts 57, said connection at 54 making possible an axial shifting of the mandrel inner end relative to shaft section 14.

The numerals 60 denote a plurality of adjustable stop members, each of which include an outer headed portion 62, an intermediate threaded portion 64, and an inner or terminal portion 66 which terminates in a flat end surface 68. Each stop member is receivable within an internally threaded opening 70 provided in each of mold portions 30 and 32, whereby each adjustable stop member is selectively movable toward and from a face of valve disc 12 when mounted within the mold.

As best illustrated in FIG. 5, the inner or terminal portion 66, is smooth, cylindrical and of reduced diameter, to snugly, though slidably be received within a smooth walled elongate bore 72 of a mold portion 30 or 32. The desired fit is such as to preclude accidental or unintentional extrusion of heat-fluidified plastic material between or along the adjacent surfaces of terminal portion 66 and an elongate bore 72.

The valving member and the mold are initially preheated prior to placing the valving member in the mold cavity, and uniformly satisfactory results have been obtained in those instances in which the valving member is initially preheated to approximately 600° F. and the mold preheated to 300° F. after which the preheated valving member is secured within the mold elements as illustrated in FIG. 2.

Thereafter, the entire assembly is preheated until the mold, per se, attains a temperature of approximately 600° F. with the valving member in place.

While the valving member-mold assembly is being preheated, as aforesaid, the flat end surfaces 68, of each of the adjustable stop members 60, are disposed substantially flush with the inner surface Q of the valve disc receptive portion of the mold cavtiy, as illustrated in FIG. 2. After the assembly has been suitably preheated to 600° F., each of the adjustable stop members are selectively advanced whereby each end surface 68 abut against and thereby provide positive lateral support for opposite faces or surfaces P of the valve disc 12, as illustrated in FIG. 3.

In the preferred embodiment of hte invention and as best illustrated in FIGS. 2 and 6, means in the form of a flat 80 to produce a .010 opening in open communication with a larger opening 82 in end plate 56 is provided for establishing a restricted opening through which the heat-fluidified platsic material will be extruded for continuously providing a visual indication as to the degree of fluidity of the coating material within the mold during the injection process.

Coating plastic indicated by the numeral 90 is introduced under pressure of 1500 p.s.i. as a heat-fluidified fluid into the cavity of mold portions 30 and 32 via a cylinder 92 and sprue 94 by means of a pressure-actuated plunger 96, see FIG. 3. The force of the plunger drives the plastic through disc aperture 20, laterally in all directions over and under the valving member and through openings 22 until all parts of the valving member which are exposed within the mold cavity are coated with plastic material.

Uniformly satisfactory results have been obtained in those instances in which the coating materail is injected into the mold cavity at a temperature of approximately 630° F. and, as already noted, under 1500 p.s.i. The injecting pressure is maintained on the heat-fluidified coating material as the temperature of the mold cools, and when the temperature of the coating material within the mold has been reduced to approximately 575° F., or just prior to the time when the coating material is coming out of gel, the adjustable stop members 60 which engage the upper lateral surface of the valve disc are selectively moved out of contact with surface P of the disc, and thereafter, those adjustable stop members whose end surfaces 68 engage the lower surface P of the valve disc are selectively moved away from and out of contact with the disc. The pressure being applied to the heat-fluidified coating material within the mold cavity will thereupon fill the voids resulting from retractile movement of the adjustable stop members from contact with axial faces P of the valve disc.

In the preferred embodiment of the invention, the stop members are selectively moved from the face of the valve disc by an amount whereby end surface 68 will be disposed beneath surface Q of the mold cavity for thereby providing a protuberance or tit 98, note FIGS. 7 and 8.

Thereafter, and while the coating material being extruded (as at 100) through opening 82 is coming out of gel, mandrel 50 is manipulated to retract its inner end from the turning center hole 52 of shaft section 14 thereby providing an entrance for fluid plastic material into said hole. In this way the terminal end of shaft section is assured a complete covering of coating material as clearly evident from FIGS. 6 and 9.

The mold and its contents are permitted to cool, and when the temperature of the assembly has been reduced to about 300° F. the mold may be parted to release the coated valving member. The protuberances 98 are suitably removed, such as by a grinding operation, for providing a substantially smooth, axial surface to each side of the valve disc.

In some instances it may be desirable to provide means for internally heating the mold elements, such as, by way of example, is illustrated in FIGS. 2–5, wherein mold inserts 110 are provided having suitable openings 112 therein for the reception of conventional heating elements, not illustrated.

From the foregoing it will be noted that the valve disc of the valving member is laterally supported in such a manner as to preclude any deflection within the mold cavity during injection of the heat fluidified plastic coating material, and such positive lateral support is maintained until such time as the coating material has cooled sufficiently to attain a partial set sufficient to provide plastic support for the unsupported portions of the valving member, even though, and while the platsic material is in a state of gel; or stated otherwise while the plastic material is coming out of gel, as that term is understood in the art.

What is claimed is:

1. The method of applying a protective coating to a butterfly-type valving member comprising a substantially flat circular valve disc having a pair of axially aligned cylindrical shaft sections projecting from opposite ends of a diameter thereof, one shaft section comprising a sub-shaft having a terminal end provided with a turning center hole in the terminal end thereof, the other shaft section comprising an actuating stem having an outer end, said method comprising; providing a separable mold having a cavity complementing the contour of the valving member, the cavity having clearance at all points of the valving member when the valving member is disposed therein, preheating the valving member to approximately 600° F., preheating the mold to approximately 300° F., placing the preheated valving member in the preheated mold, axially supporting the terminal end of the stub shaft from the turning center hole, supporting the outer end of the actuating stem, heating the assembled mold and valving member to approximately 600° F., providing a plurality of adjustable stop members each of which are selectively movable toward and contacting a surface of the valve disc for providing lateral support thereto, and movable from said surface for removing said lateral support by an amount at least equal to the thickness of the coating member applied to that surface of the valve disc initially supported by said stop members, laterally supporting the opposite faces of said valve disc with said stop members, to center and support the valving member in the mold cavity with a predetermined uniformity of cavity clearance; injecting into the mold cavity, under pressure, a heat-fluidified plastic coating material at a temperature of about 630° F., and a pressure of about 1500 p.s.i. to fill the cavity and encapsulate the body plate and shaft sections; providing an opening in the mold adjacent the terminal end of the stub shaft for communicating the mold cavity directly with atmosphere, extruding heat fluidified plastic coating material from the mold through the opening to provide a continuous visual indication of the degree of fluidity of the material within the mold, observing the degree of fluidity of the material, maintaining said pressure on the coating material in the mold and reducing the temperature of the coating material to approximately 575° F., to partially set the plastic material to the extent of providing plastic support for the weight of the valve disc and the stub shaft, removing the lateral support from the faces of said valve disc a distance greater than the thickness of the coating when the observed fluidity is of a proper degree to thus leave protuberances on the coating, while continuing to pressure feed heat-softened plastic material into the mold cavity for filling the voids resulting from removal of the aforesaid lateral support, withdrawing the axial support from the terminal end of the stub shaft, to impose the weight thereof upon the partially set plastic material while exposing the turning center hole for entry of plastic material, continuing to pressure feed heat-softened plastic material into the mold cavity for filling the exposed turning center hole, reducing the mold temperature to about 300° F. to solidify the plastic material within the mold cavity, then parting the mold to release the coated valving member, and removing the protuberances.

References Cited
UNITED STATES PATENTS

| | | | |
|---|---|---|---|
| 3,363,040 | 1/1968 | Aoki | 264—278 |
| 3,187,074 | 6/1965 | Morin | 264—161 |
| 3,670,071 | 6/1972 | Walchle | 264—278 |
| 3,537,683 | 11/1970 | Snell, Jr. | 264—275 |
| 3,549,477 | 12/1970 | Burgman | 264—275 |
| 3,074,112 | 1/1963 | Bobron | 264—275 |
| 2,903,389 | 9/1959 | Fujita | 264—128 |
| 3,208,750 | 9/1965 | Firth et al. | 264—278 |

ROBERT F. WHITE, Primary Examiner

J. B. LOWE, Assistant Examiner

U.S. Cl. X.R.

264—162, 278